(12) United States Patent
Furuya et al.

(10) Patent No.: US 6,456,404 B1
(45) Date of Patent: Sep. 24, 2002

(54) IMAGE PROCESS APPARATUS, IMAGE PROCESS METHOD AND STORAGE MEDIUM

(75) Inventors: Tomoyuki Furuya, Kawasaki; Hiroshi Matsuki, Yokohama; Yoshinari Ohnishi, Funabashi, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/901,666

(22) Filed: Jul. 28, 1997

(30) Foreign Application Priority Data

Jul. 31, 1996 (JP) ............................................ 8-202051

(51) Int. Cl.$^7$ ................................................ G03F 3/08
(52) U.S. Cl. ..................... 358/523; 358/1.9; 358/518; 382/167
(58) Field of Search ................................. 358/523, 505, 358/500, 296, 518, 530, 529, 534, 536, 455–459, 465–466, 298, 1.9, 501; 382/270, 167, 162, 166, 252; 345/431, 150–154, 593, 522, 589, 237

(56) References Cited

U.S. PATENT DOCUMENTS

| | | | |
|---|---|---|---|
| 4,958,218 A | * 9/1990 | Katayama et al. | 358/530 |
| 5,128,748 A | 7/1992 | Murakami et al. | 358/500 |
| 5,313,312 A | * 5/1994 | Yamada | 358/505 |
| 5,367,387 A | * 11/1994 | Yamaguchi | 358/518 |
| 5,475,496 A | * 12/1995 | Kumada | 358/298 |
| 5,729,360 A | 3/1998 | Kita et al. | 358/500 |
| 5,734,744 A | * 3/1998 | Wittenstein et al. | 382/166 |
| 5,748,343 A | * 5/1998 | Ikeda | 358/501 |
| 5,949,427 A | * 9/1999 | Nishikawa et al. | 345/593 |

FOREIGN PATENT DOCUMENTS

| | | | |
|---|---|---|---|
| EP | 0122430 | 10/1994 | .......... G03G/15/32 |
| EP | 0665676 | 8/1995 | ............ H04N/1/60 |
| GB | 2132052 | 6/1984 | ............ H04N/1/46 |

* cited by examiner

Primary Examiner—Leo Boudreau
Assistant Examiner—Ishrat Sherali
(74) Attorney, Agent, or Firm—Fitzpatrick, Cella, Harper & Scinto

(57) ABSTRACT

Image information which represents an object image and includes a logical operation table is input to a color convertor which converts the input image information into color image data including a black density component and a plurality of color density components. A data convertor converts the color image data into a linearly independent color image data by converting the blank density component into a plurality of color density components. A logical operator performs a logical operation on a plurality of color component data forming the linearly independent color image data on the basis of the logical operation table.

9 Claims, 10 Drawing Sheets

IMAGE PROCESS APPARATUS, IMAGE PROCESS METHOD AND STORAGE MEDIUM

BACKGROUND OF THE INVENTION

1. Field of the Invention

The present invention relates to image process apparatus and method which perform a coloring process on inputted image data.

2. Related Background Art

In a case where an image formed based on color image data is satisfactorily outputted by a color printer, on each of a plurality of objects which constitute the output image, coloring processes such as a color correcting process, a color converting process, a binarizing process and the like according to the type of object are necessary. In this case, an output result and printing process speed are remarkably influenced by operational factors, i.e., in what order such the coloring processes are performed on the respective objects and at what timing the objects subjected to such coloring processes are written into a buffer.

In conventional techniques, roughly, two types of processes are provided.

It is assumed that the process in a high-speed mode is provided as the first conventional technique. FIG. 11 is a block diagram showing a flow of the process in the high-speed mode.

In the high-speed mode, a color correcting process unit performs the color correcting process on each object to convert color information (i.e., RGB multivalue data) of such object into R'G'B' multivalue data, and a binarizing process unit performs the binarizing process on the R'G'B' multivalue data to store obtained RGB binary data into a buffer. Then, a color converting process unit performs the color converting process on the RGB binary data in the buffer to convert them into CMYK binary data and transfer the converted CMYK binary data to an output unit (i.e., printer).

As a feature of the high-speed mode, it is pointed out that printing speed is high since the object is binarized once and then written (i.e., stored) into the buffer. However, since the RGB multivalue data are once converted into the RGB binary data, a non-linear color converting process including an under color removal (UCR) process is impossible. Therefore, there is a drawback that color reproducibility is poor.

It is assumed that the process in a high-quality mode is provided as the second conventional technique. FIG. 12 is a block diagram showing a flow of the process in the high-quality mode.

In the high-quality mode, a color correcting process unit performs the color correcting process on each object to convert color information (i.e., RGB multivalue data) of such object into R'G'B' multivalue data and stores the obtained R'G'B' multivalue data into a buffer. Then, a color converting process unit performs the color converting process on the R'G'B' multivalue data in the buffer to convert them into CMYK multivalue data, and a binarizing process unit performs the binarizing process on the converted CMYK multivalue data to generate CMYK binary data and thus transfers the obtained CMYK binary data to an output unit (i.e., a printer).

As a feature of the high-quality mode, it is pointed out that the non-linear color converting process including the UCR process is performed since the RGB multivalue data are converted into the CMYK multivalue data in the color converting process, whereby good color reproducibility is obtained. However, since the object is written into the buffer in the form of multivalue data as is, there is a drawback that the printing speed is low.

Conventionally, the RGB multivalue data or the RGB binary data is stored in the buffer. Therefore, a logical operation process could well be performed by using a logical operation code for a luminance component designated from an application (i.e., application software).

In order to effect advantages of these two types of modes, it is necessary for a user to designate which mode is used to perform the process in accordance with the desired output result, i.e., a user's intended use. However, even if the user selects either mode, it is necessary for the user to compromisingly put up with either one of the printing process speed and the printing quality.

On the other hand, if it is intended to provide a mode which can derive the advantages in both the above-described two conventional techniques, the CMYK binary data must be stored into the buffer. If the flow of process is set in such a manner, the logical operation process is indispensably performed on the basis of the CMYK binary data. In this case, since the CMYK binary data is not linearly independent data, a satisfactory result of the logical operation process can not be obtained.

SUMMARY OF THE INVENTION

The present invention is made in consideration of the above-described drawbacks. An object of the first invention is to perform a good logical operation process on color image data consisting of a black density component and a plurality of color density components.

In order to achieve the above object, according to a first feature, there is provided an image process apparatus comprising:

input means for inputting input image information which represents an object image and includes a logical operation table;

color conversion means for converting the input image information into color image data consisting of the black density component and the plurality of color density components;

conversion means for converting the color image data into linearly independent color image data, by converting the black density component into the plurality of color density components; and logical operation process means for performing, on the basis of the logical operation table, the logical operation process on a plurality of color component data which constitute the linearly independent color image data converted by the conversion means.

Further, an object of the second invention is to perform a process according to use intended by a user, by independently setting a mode for a color matching process and a mode for an N-value data generating process.

In order to achieve the above object, according to a second feature, there is provided an image process apparatus comprising:

input means for inputting input image information which represents an object and includes a drawing function and a color designation code;

coloring process mode setting means for setting a coloring process mode on the basis of manual instructions by the user;

coloring process setting means for setting, in a case where an automatic setting mode is set by the coloring process mode setting means, a coloring process according to a type of the object by analyzing the drawing function;

color matching process means for performing the color matching process on color data indicated by the color designation code, on the basis of the setting; and N-value data generating process means for performing the N-value data generating process on the color data indicated by the color designation code, on the basis of the setting, wherein the coloring process mode setting means can set the mode for the color matching process and the N-value data generating process, independently.

Furthermore, an object of the third invention is to adequately or exactly set a color matching process according to a characteristic of an object.

In order to achieve the above object, according to a third feature, there is provided a storage medium which stores a program for an image process method comprising:

an input step of inputting input image information which represents the object and includes a drawing function and a color designation code;

a coloring process mode setting step of setting a coloring process mode on the basis of manual instructions by a user;

a coloring process setting step of setting, in a case where an automatic setting mode is set in said coloring process mode setting step, a coloring process according to a type of the object by analyzing the drawing function;

a color matching process step of performing the color matching process on color data indicated by the color designation code, on the basis of the setting; and an N-value data generating process step of performing an N-value data generating process on the color data indicated by the color designation code, on the basis of the setting, wherein the coloring process mode setting step sets the mode for the color matching process and the N-value data generating process, independently.

The above and other objects of the present invention will become apparent from the following detailed description when read in conjunction with the accompanying drawings.

DETAILED DESCRIPTION OF PREFERRED EMBODIMENTS

Hereinafter, the embodiments of the present invention are explained in detail with reference to the accompanying drawings.

(First Embodiment)

Figure 1:
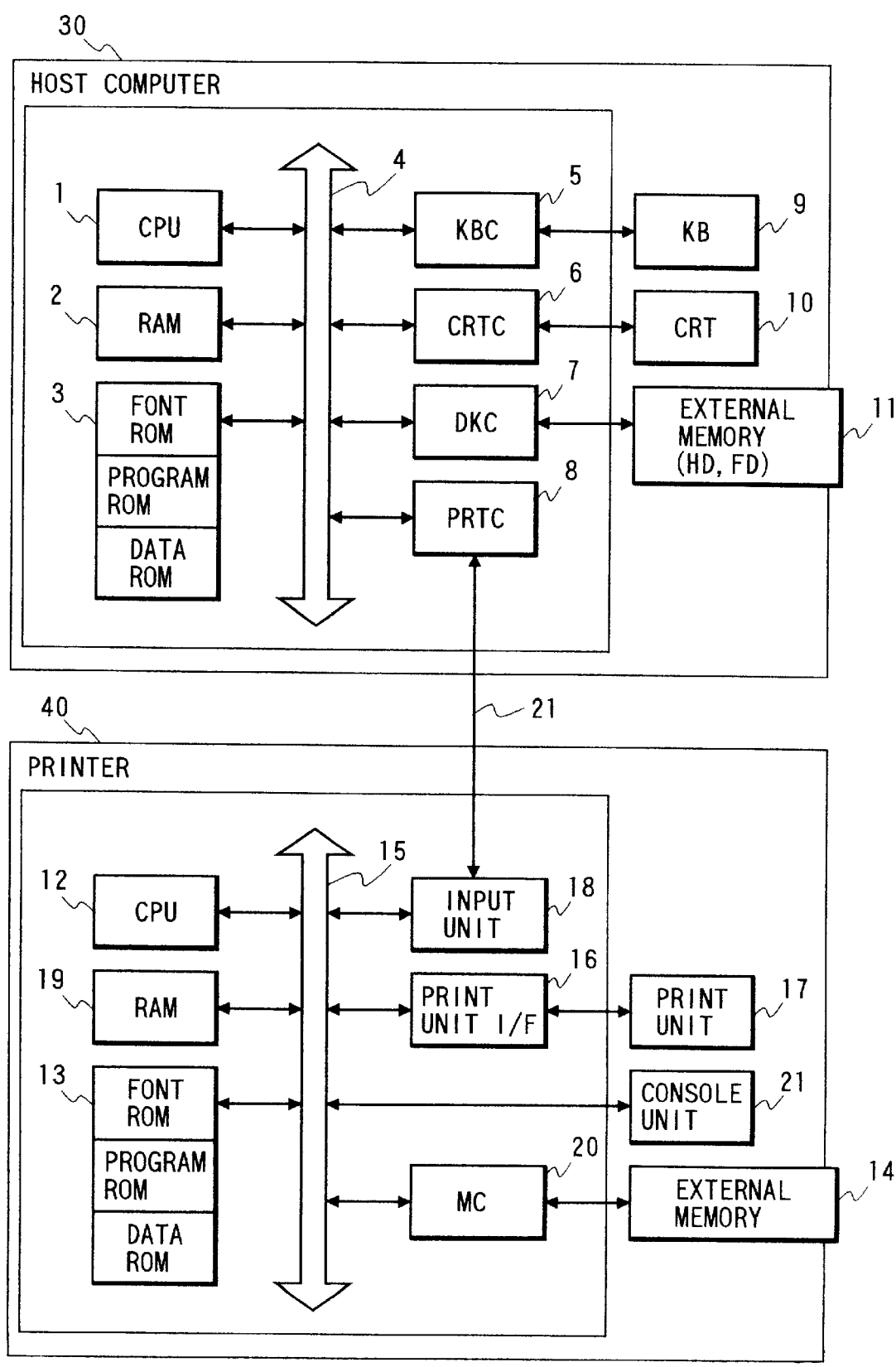
FIG. 1 is a block diagram for describing the structure of a print control apparatus according to a first embodiment of the present invention.

FIG. 1 is a block diagram showing a print control apparatus according to the first embodiment of the present invention. It should be noted that the present invention does not depend on whether a color correcting process unit, a color converting process unit and a binarizing process unit are provided in a host computer (i.e., a printer driver) or in a printer. Similarly, it should be noted that the present invention does not depend on whether a buffer is provided in the host computer or in the printer.

The print control apparatus according to the present embodiment consists of a host computer 30 and a printer 40.

The host computer 30 has a read only memory (ROM) 3 which consists of a font ROM, a program ROM and a data ROM; a random access memory (RAM) 2; a central processing unit (CPU) 1 which performs various processes by using the RAM 2 as a working memory on the basis of a program stored in the ROM 3; a bus 4 which transfers various data; a keyboard connector (KBC) 5 which connects the bus 4 and a keyboard (KB) 9 with each other; a CRT connector (CRTC) 6 which connects the bus 4 and a cathode ray tube (CRT) 10 with each other; a disk connector (DKC) 7 which connects the bus 4 and an external memory 11 such as a hard disk (HD), a floppy disk (FD) or the like, with each other; and a printer connector (PRTC) 8 which connects the bus 4 and the printer 40 with each other.

The printer 40 has a CPU 12, a RAM 19, a ROM 13 and a bus 15 which have the same functions as those of the CPU 1, the RAM 2, the ROM 3 and the bus 4 in the host computer 30, respectively. Further, the printer 40 has an input unit 18 which transmits and receives data to and from the host computer 30 through a two-way communication line 21, a print unit interface 16 which connects the bus 15 and a print unit 17 with each other, a memory controller (MC) 20 which connects the bus 15 and an external memory 14 with each other, and a console unit 21.

Figure 2:
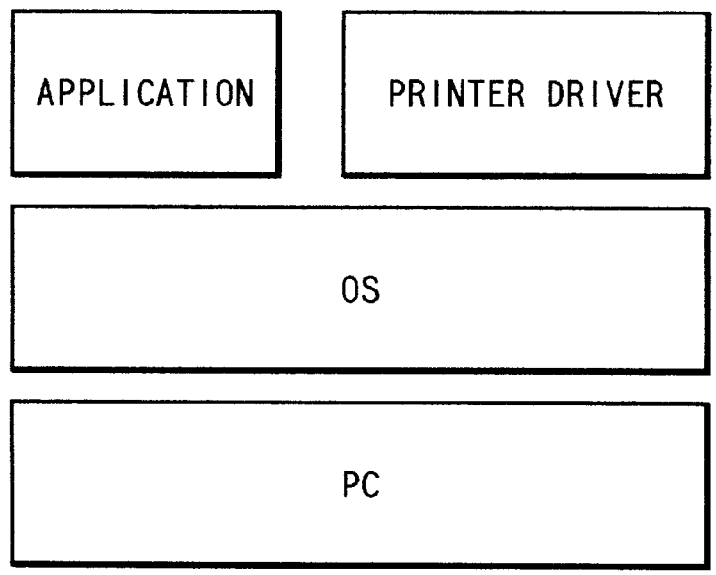
FIG. 2 is a view showing the hierarchy structure of a host computer according to the first embodiment.

FIG. 2 is a view showing hierarchy structure of a software and hardware in the host computer 30. That is, in the hierarchy structure, an application (or application software) such as a desktop publishing (DTP) software or the like which is stored in the external memory and a later-described printer driver are operated on an operation system (OS). Further, each circuit (PC) in the host computer 30 is controlled based on the OS.

Hereinafter, a process of the printer driver according to the present embodiment is described in detail with reference to the accompanying drawings.

Figure 3:
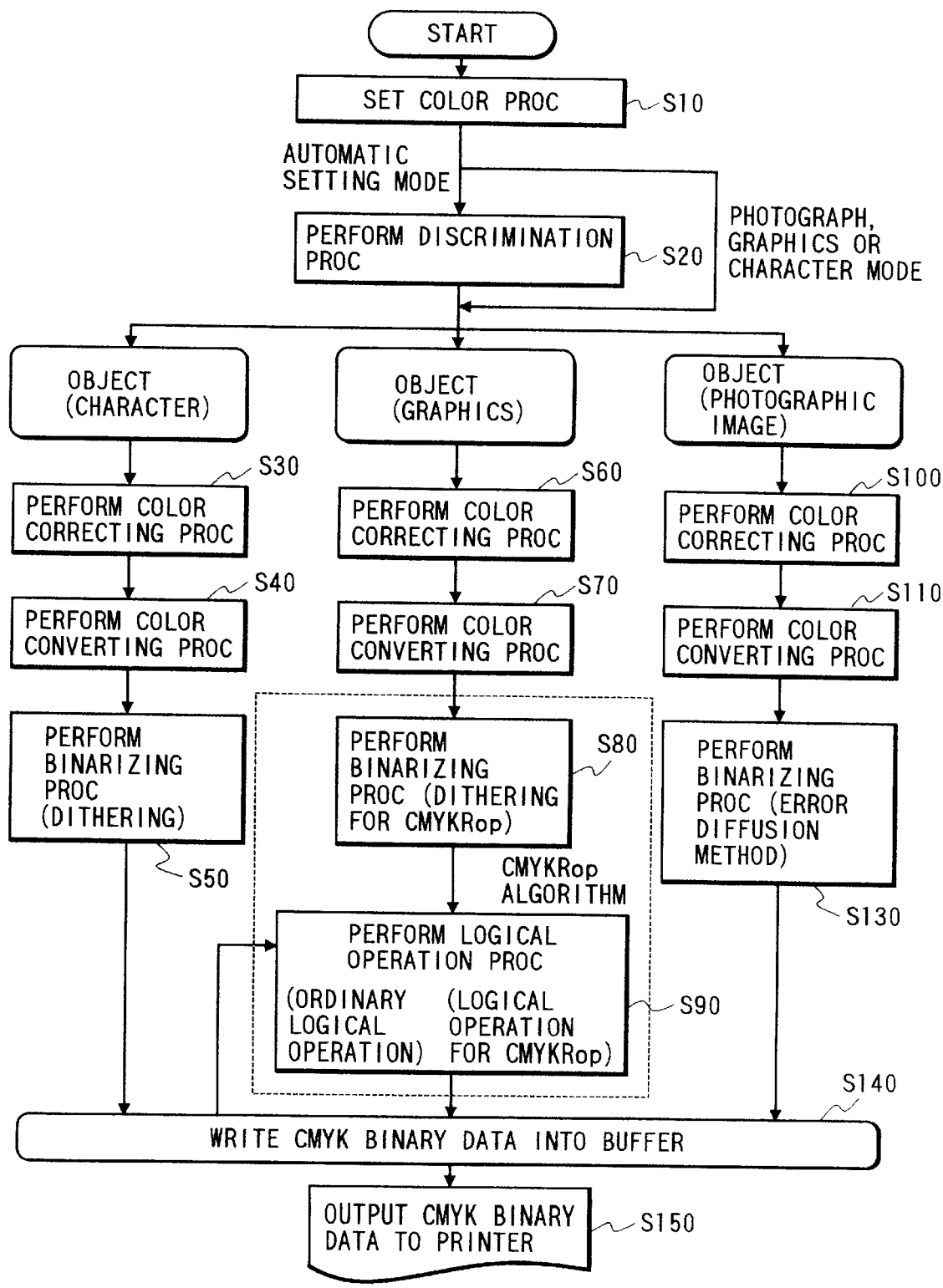
FIG. 3 is a flow chart showing a process in a high-quality and high-speed mode.

FIG. 3 is a flow chart showing the process of the printer driver in a high-quality and high-speed mode.

Figure 4:
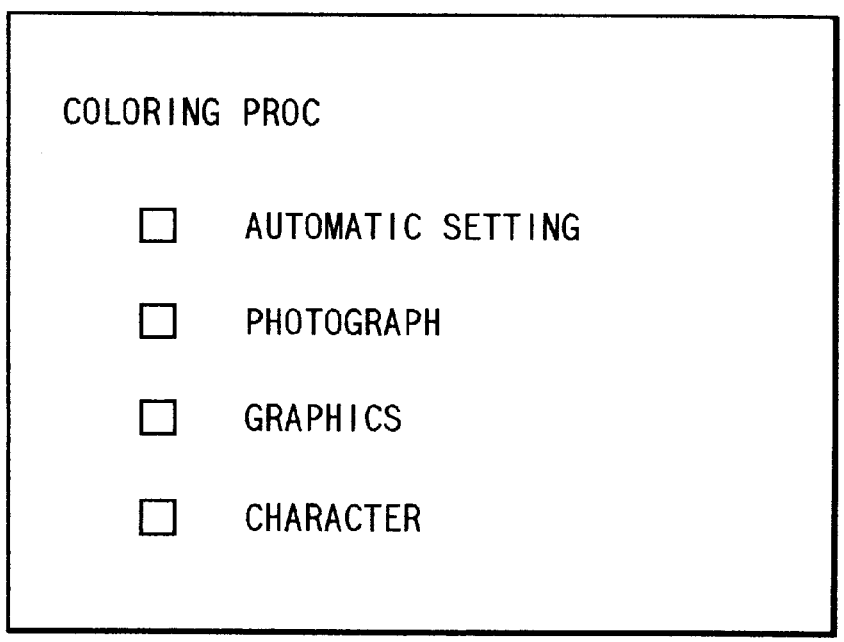
FIG. 4 is a view showing a user interface according to the first embodiment.

FIG. 4 is a view showing an image plane which is used to set the coloring process of the printer driver. On the image plane, a user sets by using the KB 9 a coloring process mode by selecting either one of an automatic setting mode, a photograph mode, a graphics mode and a character mode (step S10). In a default state, the automatic setting mode is set.

In each of the photograph mode, the graphics mode and the character mode, the coloring process suitable for an object type intended to be processed in each mode is performed for an input image as a whole.

On the other hand, in a case where the automatic setting mode is set, the object type is discriminated for each of the objects constituting the input image, and then the coloring process according to a discriminated result is performed.

Input image information which is inputted from the application through the OS is composed of a drawing function, a color designation code and the like.

For example, the input image information which represents a character is composed of the drawing function representing the character and a character code representing the character type. Further, the input image information which represents graphics is composed of the drawing function representing a type of the graphics or figures, a raster operation (Rop) code, position information representing a position at which the object is drawn, and a color designation command. Furthermore, the input image information which represents a photograph is composed of bit-map information and header information representing a format (i.e., the number of colors) of the bit-map information, the position information and the like.

In a case where the automatic setting mode is set in the step S10, the flow advances to a step S20 to discriminate, based on the drawing function included in the input image data, the object type represented by this input image data, and to set the coloring process to be performed on this object.

In a case where the bit-map information is included in the input image data, the number of colors included in the header information is discriminated. Then, if the number of colors is equal to or larger than a predetermined value, the object is discriminated as a photographic image and thus the coloring process for the photograph is set. On the other hand, if the number of colors is smaller than the predetermined value, the object is discriminated as a graphics image and thus the coloring process for the graphics is set.

In the photographic image (i.e., natural image), gradation (or tonality) is expressed by using a large number of colors as compared with the character image or the graphics image. For this reason, when a binarizing process is performed in the coloring process for the photographic image, an error diffusion method in which long processing time is necessary is used since such process attaches importance to the gradation or tonality. In the case where the number of colors included in the bit-map information is smaller than the predetermined value, it can be judged that the tonality is not important in this object. Therefore, since it is not so effective in this case to perform the coloring process for the photograph which attaches importance to the tonality, the coloring process for the graphics of which processing time is short is selected.

In a case where the satisfactory output result corresponding to the input image is outputted by the printer, it must be performed the coloring processes including the color correcting process (obtaining R'G'B' multivalue data from RGB multivalue data), the color converting process (obtaining CMYK multivalue data from RGB multivalue data; or obtaining CMYK binary data from RGB binary data); and the binarizing process (obtaining CMYK binary data from CMYK binary data; or obtaining RGB binary data from RGB multivalue data).

Since a color reproduction gamut (or range) of the printer is narrower than that of a monitor or a scanner, sometimes the input image includes a color which is outside the color reproduction gamut of the printer. In such a case, the input image can not be faithfully reproduced by the printer. Therefore, it is performed as the color correcting process a color matching process in which the input color is subjected to mapping into the color reproduction gamut of the printer. That is, the color correcting process unit for the character performs the color matching process such that a color difference between the input color and an output color becomes minimum (step S30). Further, the color correcting process unit for the graphics attaches importance to vividness of color, and thus performs the color matching process such that a saturation component of the input color is maintained as much as possible (step S60). Furthermore, the color correcting process unit for the photograph attaches importance to continuity of color (i.e., tonality) in the image, and thus performs the color matching process such that a hue is maintained (step S100).

The color converting process unit performs a masking under color removal (UCR) process and a gamma process on the basis of output characteristics depending on a coloring agent and a print mode of the printer (steps S40, S70 and S110). In the present embodiment, the color converting process unit performs the same color converting process irrespective of the object type. However, the color converting process unit may perform the color converting process in accordance with the object type.

Like the color correcting process unit, the binarizing process unit performs the binarizing process in accordance with the object type. That is, the binarizing process unit for the character performs a dithering process by using such a dither matrix as an edge portion is made plain and also black is emphasized (step S50). Further, the binarizing process unit for the graphics performs the dithering process by using a dither matrix based on a CMYKRop algorithm as described later (step S80). Furthermore, the binarizing process unit for the photograph attaches importance to the tonality or gradation, and thus performs the binarizing process by using the error diffusion method (step S130).

On the object which belongs to the graphics, a logical operation process according to the Rop code included in the input image data is performed on the basis of the CMYKRop algorithm (step S90).

The object image is developed on the basis of the CMYK binary data which is subjected to the coloring process according to the setting coloring process mode. Then, the developed object image is written into the buffer in the form of the CMYK binary data, on the basis of position information included in the input image information (step S140).

Then the CMYK binary data stored or written in the buffer is outputted to the printer (step S150).

In a case where the high-quality and high-speed mode in the present embodiment is compared with the two types of modes in the conventional technique, it is seen that, since the RGB multivalue data are converted into the CMYK multivalue data in the color converting process, the color reproducibility is improved in the present embodiment (i.e., the obtained color reproducibility is substantially equal to that in the conventional high-quality mode). Moreover, it is seen that, since the obtained CMYK multivalue data are binarized, subjected to the developing process and then stored in the buffer, the printing speed is improved in the present embodiment (i.e., the obtained printing speed is substantially equal to that in the conventional high-speed mode).

Further, in the case where the automatic setting mode is being set, since the coloring process is performed for each object and then the processed object is written into the buffer, the coloring process and the binarizing process both according to the characteristic of the object are performed in the present embodiment.

Such an operation as described above is the processing flow in the high-quality and high-speed mode according to the present embodiment. However, when the object of the graphics is written into the buffer, sometimes the logical operation process must be performed.

In the conventional high-quality mode and the high-speed mode, when the logical operation process is performed on the RGB data, since such RGB data are the linearly independent data, problems do not occur. However, in the high-quality and high-speed mode, since the logical operation process is performed on the CMYK binary data which are not linearly independent data, there is a problem that the logical operation process can not be accurately performed.

Since the K (black) data includes C (cyan), M (magenta) and Y (yellow) components and each component of the CMYK data can not be considered independently, the CMYK data are not linearly independent data.

In order to eliminate such problem, in the present embodiment, a logical operation process algorithm (assumed as CMYKRop algorithm) to be described later is used. In this case, the "Rop" represents a raster operation which is the logical operation to be performed on a pixel. Concretely, on the binary data, the "Rop" corresponds to a Boolean operation. On the other hand, on the multivalue data, the "Rop" corresponds to a process like the Boolean operation.

An outline of the CMYKRop algorithm is described hereinafter. That is, while only the logical operation process is performed by using the CMY data which are linearly independent data, the other coloring processes are performed by using the CMYK data so as to sufficiently make good use of the characteristic of the high-quality and high-speed mode.

Figure 5:
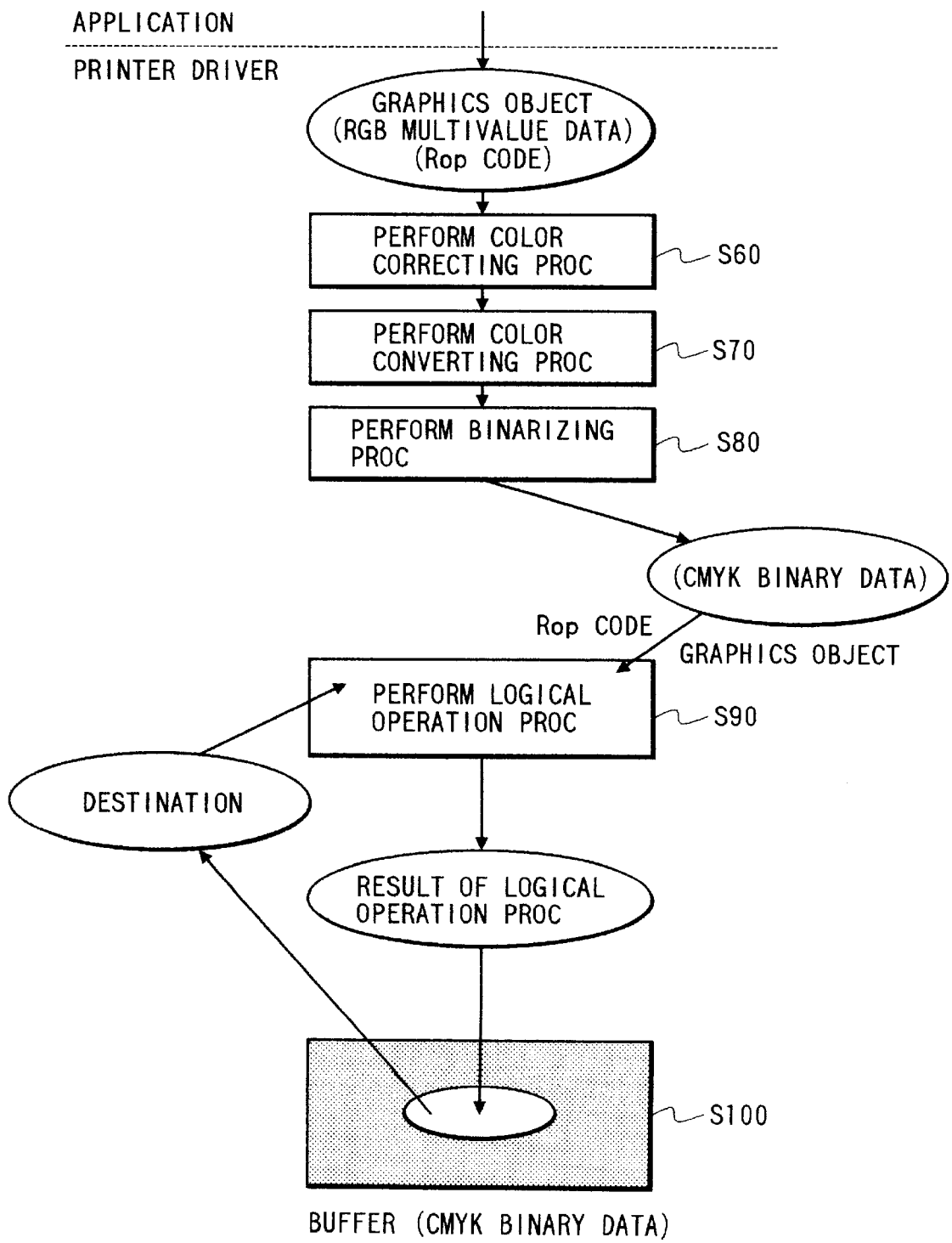
FIG. 5 is a flow chart showing a logical operation process.
Figure 8:
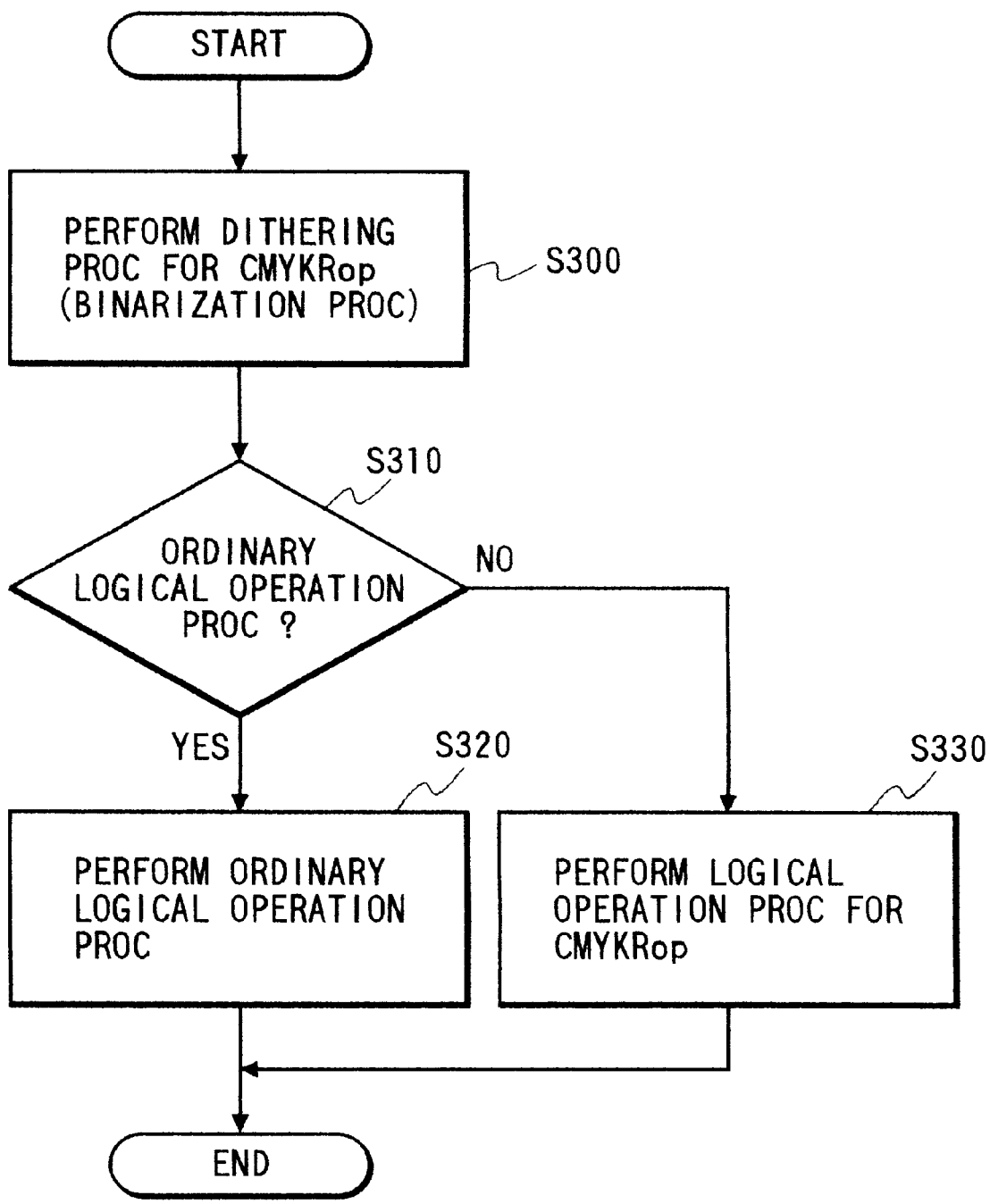
FIG. 8 is a flow chart showing a CMYKRop algorithm.

The logical operation process is the process which is performed based on the Rop code indicated by the application (i.e., application software). In the logical operation process, as shown in FIG. 5, a source (i.e., bit map) and/or a pattern (i.e., figure information; brush) corresponding to the object represented by the input image information and a destination (i.e., bit map) corresponding to the object which is already written into the buffer are arbitrarily combined with each other to be processed. In the present embodiment, an ordinary logical operation is to perform the logical operation corresponding to the Rop code on each of the CMYK data and then write obtained results onto the destination. For example, the ordinary logical operation is used in the logical operation process which overwrites the source or the pattern (i.e., input object) onto the destination. On the other hand, in the logical operation process which performs the logical operation by combining the source, the pattern and the destination with others and thus generates the object different from the input object, the logical operation for CMYKRop is used such that the process is performed by using the CMYKRop algorithm. In this case, the CMYKRop algorithm is executed based on the binarizing process (step S80) and the logical operation process (step S90) both shown within a dotted-line portion in FIG. 3. FIG. 8 is a detailed flow chart showing an entire process flow of the CMYKRop algorithm.

Figure 6:
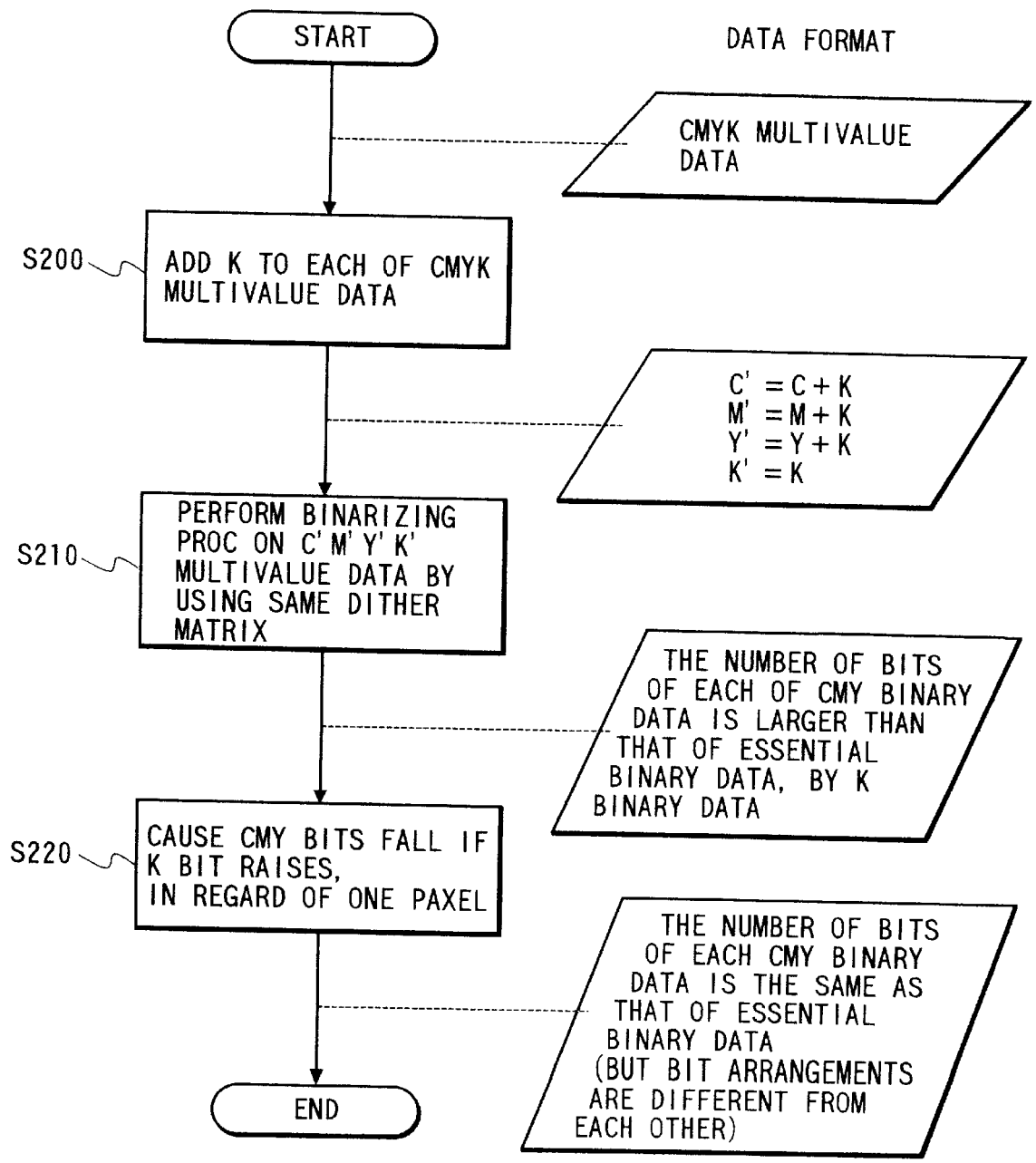
FIG. 6 is a flow chart showing a dithering process for CMYKRop.

In this flow, a dithering process for CMYKRop shown in FIG. 6 is performed (step S300). Then, by analyzing the Rop code, it is discriminated whether or not the logical operation process indicated by the target object can be performed in the form of an ordinary logical operation process (step S310). In other words, it is judged whether or not the logical operation needs to be the linearly independent operation such as the overwriting or the like.

When the process can be accurately performed by the ordinary logical operation, the logical operation process for CMY is performed on each of the CMYK data and then obtained results are written into the buffer (step S320).

Figure 7:
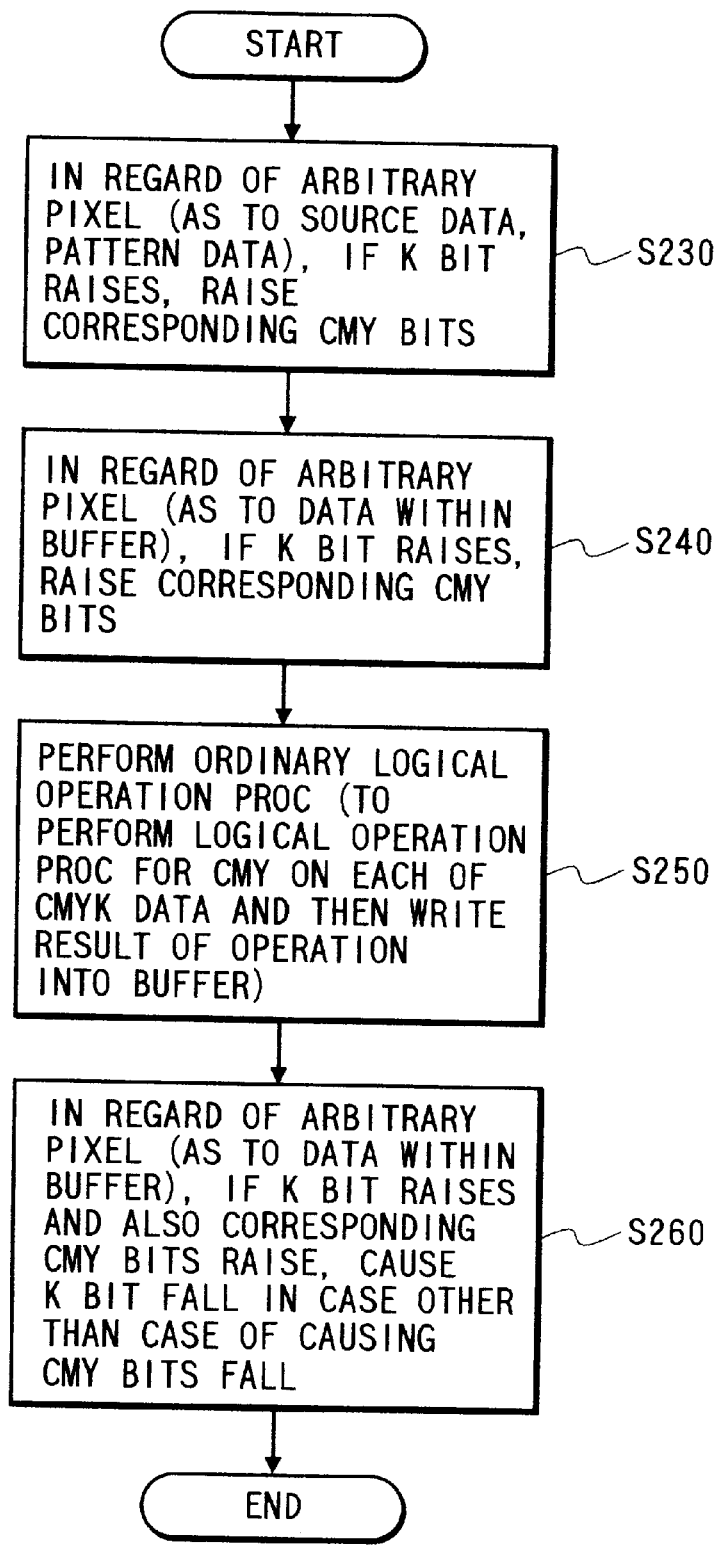
FIG. 7 is a flow chart showing a logical operation process for CMYKRop.

On the other hand, when the process can not be accurately performed by the ordinary logical operation, the logical operation process for CMYKRop shown in FIG. 7 is performed and then obtained results are written into the buffer (step S330).

There are roughly two types of components in the CMYKRop algorithm. One of the components is the logical operation process for CMYKRop. In this process, in a case where it is necessary to perform the logical operation process, the CMYK data are converted into the CMY data to be subjected to the logical operation process. Then, as to the obtained result, to give priority to CMY colors, the CMY data are again returned to the CMYK data and then stored or written into the buffer. The other of the components is the binarizing process and the dithering process for CMYKRop for allowing the logical operation process for CMYKRop locally.

FIG. 6 is a flow chart showing the dithering process for CMYKRop.

The object of the dithering process for CMYKRop is to perform, in case of binarizing the CMYK multivalue data, the optimal binarizing as to a color density. Further, the object of the process is to cause, as to bit arrangement, the CMY data returned from the CMYK data in the logical operation process for CMYKRop to have the bit arrangement which is necessary for performing the logical operation process.

In the dithering process for CMYKRop, initially, to the CMYK multivalue data, the value of K data is added to the respective values of CMY data so as to generate C'M'Y'K' multivalue data (step S200).

Then, the binarizing process is performed on the C'M'Y'K' multivalue data respectively by using the same dither matrix (step S210).

Subsequently, if a K bit has a value "1" for given pixel, CMY bits for the given pixel are changed from "1" to "0", respectively, (step S220).

According to the dithering process for CMYKRop, since the same dither matrix is used to each of the CMYK colors, the K bit can certainly be raised for a black pixel. On the other hand, for a pixel having a color other than black, in the stage of multivalue data the K data is respectively added to the CMYK data with conversion, whereby the binarizing processed result in which a color density and a tint are maintained can be obtained.

That is, resultingly, the CMYK binary data representing black can be generated from the black pixel, and the CMYK binary data maintaining the tint can be generated from the pixel of the color other than black.

FIG. 7 is a flow chart showing the logical operation process for CMYKRop.

In a pre-process of the logical operation process, to the input object (i.e., source or pattern) and the destination, by returning the K bit to the CMY bits, the CMY data are converted into the CMYK data capable of representing the color with the linearly independent CMY bits (steps S230 and S240).

Subsequently, the Rop code for a luminance component which has been set based on the application is converted to obtain the Rop code for a density component. Then, by using the obtained Rop code, the logical operation process is performed on each of the CMYK data and the processed result is written into the buffer (step S250).

In a post-process of the logical operation process, the colors which are represented by the CMY bits are used. In the arbitrary pixel, in the case where all the CMY bits are being raised, such pixel represents black. Further, in the case where the K bit as well as the CMY bits have the value "1", such CMY bits are changed from "1" to "0", respectively. In other cases than these two cases, the K bit is fallen such that the colors represented by the CMY bits are reproduced (step S260).

According to the CMYKRop algorithm in the present embodiment, the CMYK data can be converted linearly independently, whereby the highly accurate logical operation is performed on the basis of the Rop code.

As described above, according to the present embodiment, a user is able to obtain the high-quality output result at high speed.

Concretely, in the case where the object is the photograph or the character, the user can obtain the output result having the quality equivalent to that in the high-quality mode at the printing process speed equivalent to that in the high-speed mode. Further, even in the case where the object is the graphics, as to the object in which the general logical operation is the overwriting, the user can obtain the output result of the quality equivalent to that in the high-quality mode at the printing process speed equivalent to that in the high-speed mode.

As to the object which is the graphics and must use the CMYKRop algorithm, the printing process speed is lower than that in the high-speed mode. However, if it takes the entire process speed into consideration, the processed result can be outputted at the speed of the extent from which any problem is not occurred.

Especially, in the case where the automatic setting mode is being set, the CMYKRop algorithm does not affect the object if such the object is the character or the photograph. Therefore, as to such the object, the user can obtain the optimal color reproducibility and the optimal printing process speed. Further, even in the case where the object is the graphics, by performing the binarizing with the dithering process for CMYKRop, the ordinary logical operation process can be used to the logical operation (i.e., overwriting of data or the like) which can be performed even on the data not linearly independent, whereby lowering of the printing process speed can be prevented.

(Modified Embodiment)

The high-quality and high-speed mode and the CMYK-Rop algorithm in the first embodiment can be applied to not only the binary data but also the multivalue data. Concretely, in a case where the printer is a multivalue printer capable of managing the data up to quadrary (i.e., four-value) data, the multivalue data is converted to the quadrary data in the dithering process for CMYKRop and then the logical operation process for CMYKRop is performed on the converted quadrary data. Thus, the high-quality and high-speed mode and the CMYKRop algorithm can be applied to the multivalue data.

Further, in the logical operation process for CMYKRop, if it raises the K bit in the case where all the CMY bits have been raised in the post-process of the logical operation, the output result which is equivalent to that in the high-speed mode can be obtained as to such a graphics object.

Figure 9:
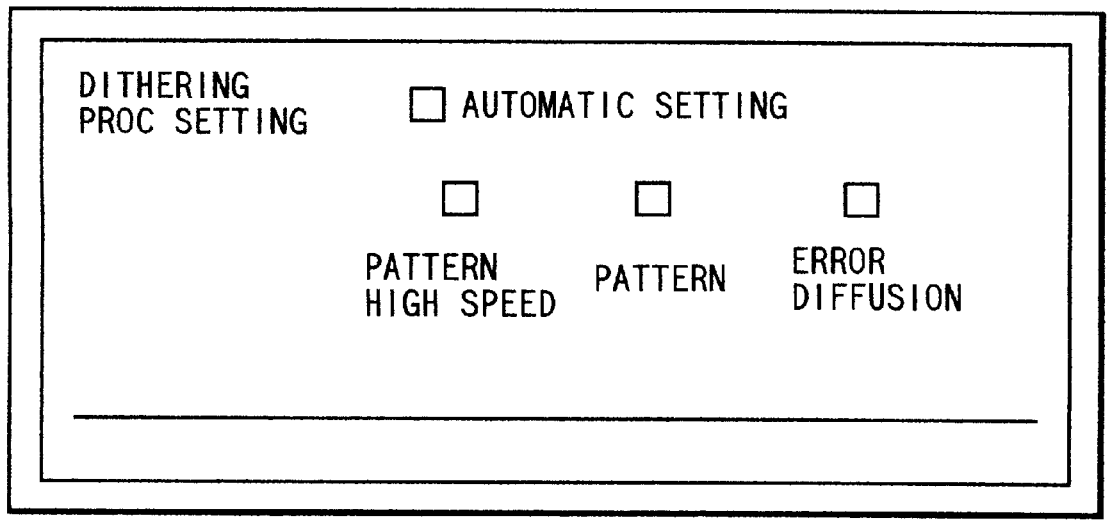
FIG. 9 is a view showing a user interface according to a modified embodiment of the present invention.
Figure 10:
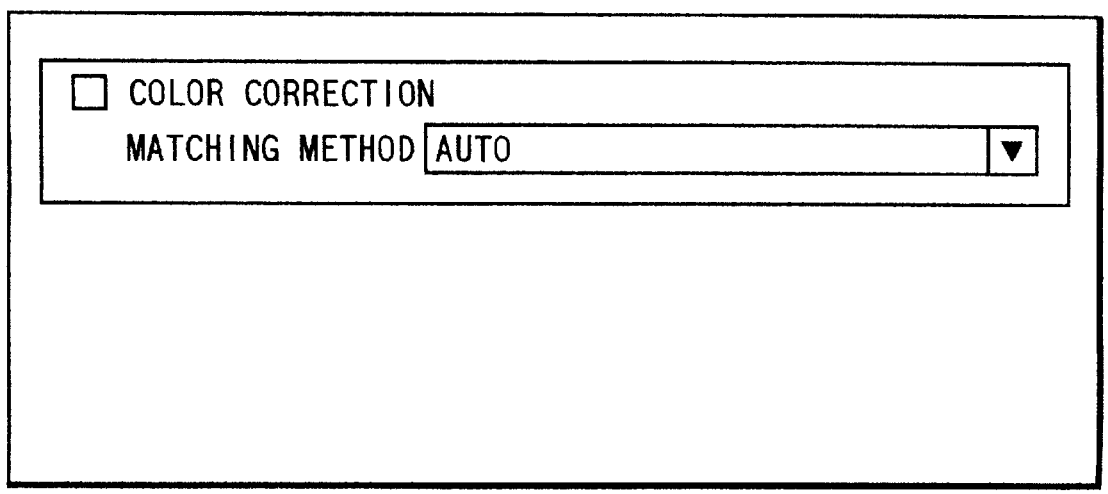
FIG. 10 is a view showing a user interface according to the modified embodiment.
Figure 11:
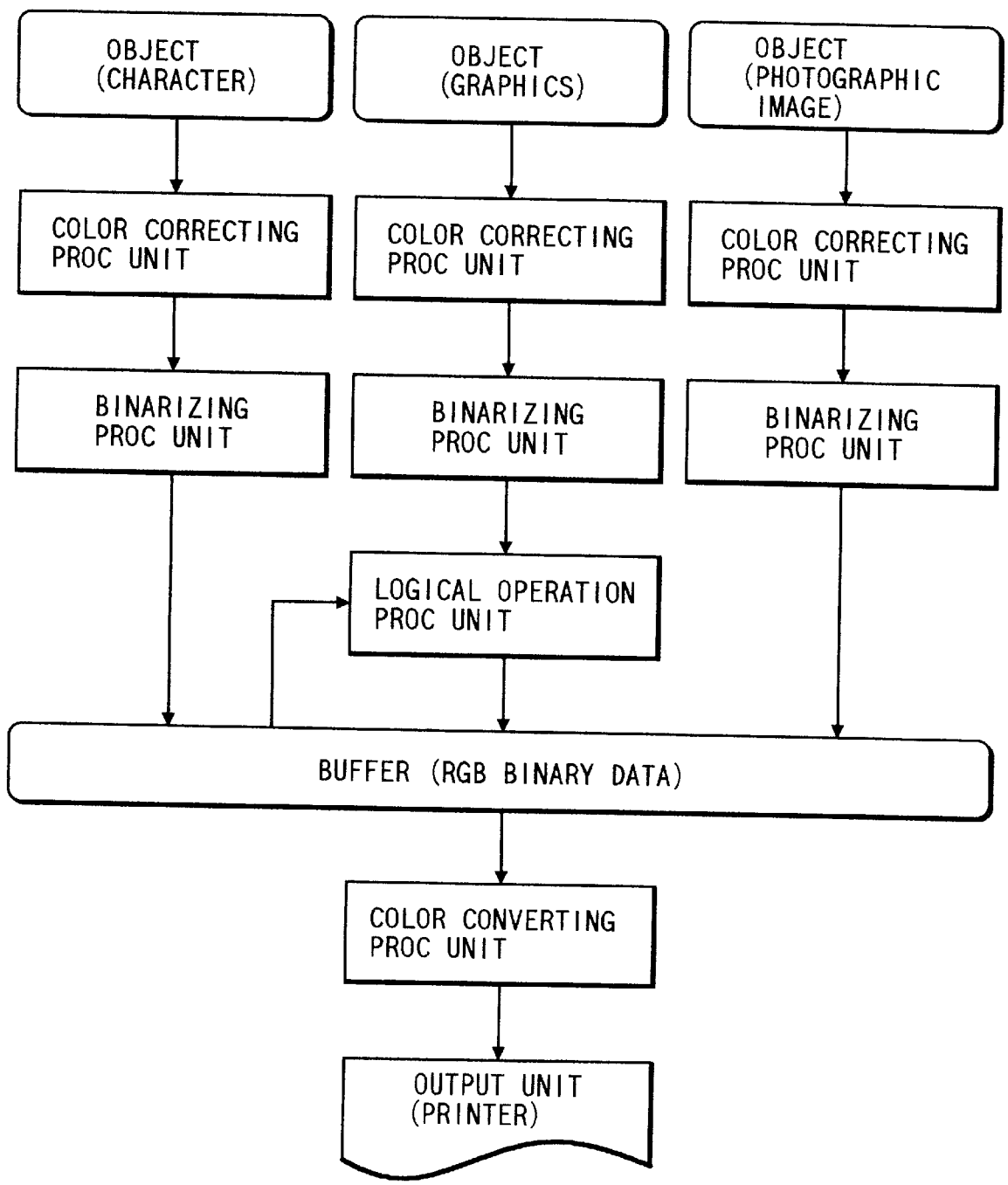
FIG. 11 is a block diagram showing a processing flow in a high-speed mode according to a conventional technique.
Figure 12:
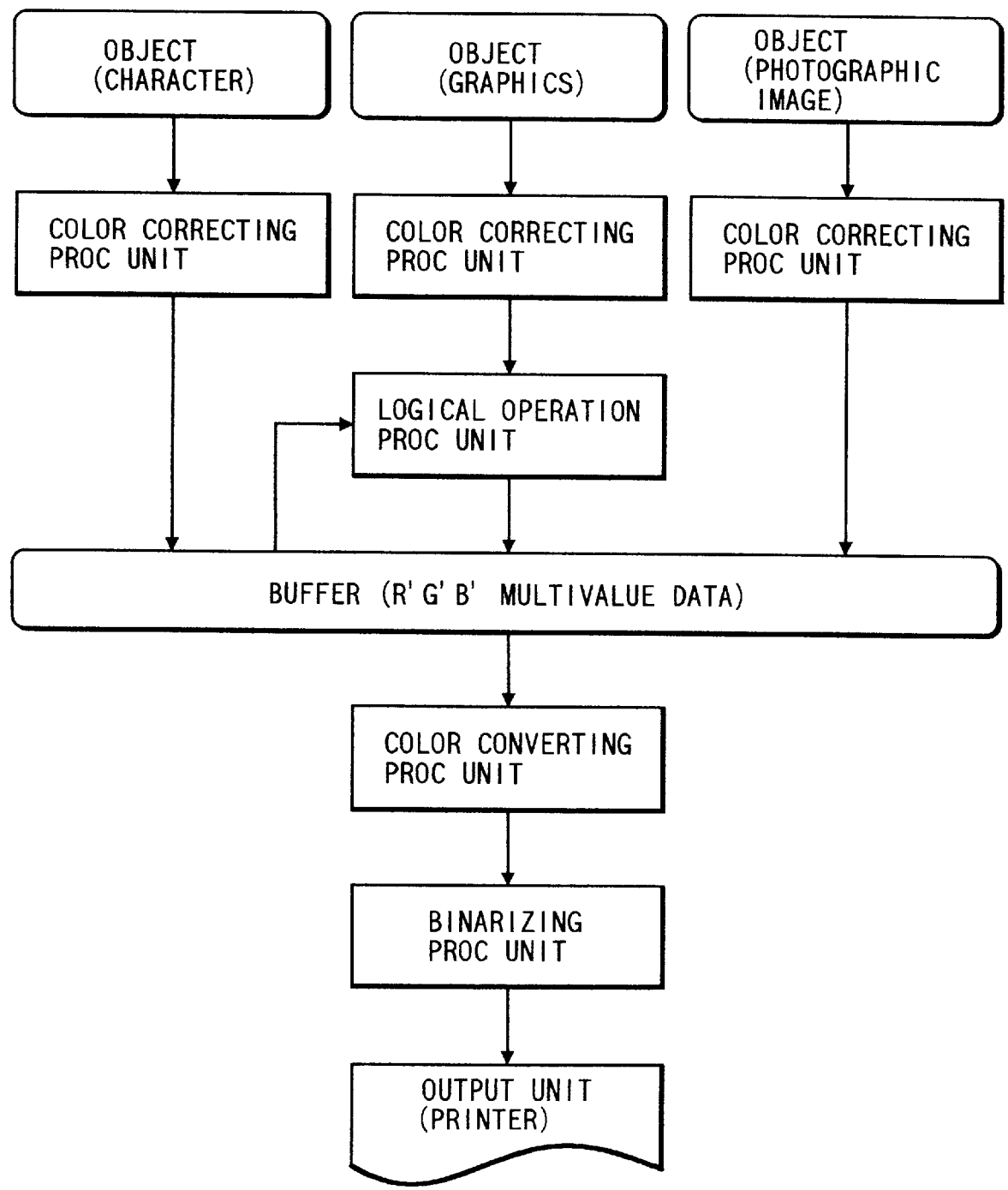
FIG. 12 is a block diagram showing a processing flow in a high-quality mode according to the conventional technique.

Furthermore, as shown in FIGS. 9 and 10, the modes in the binarizing process and the color correcting process may be set independently of each other. In the color correcting process, since the color matching process is performed by using a three-dimensional look-up table (LUT), a processing time does not vary in any color correcting process. On the other hand, in the binarizing process, a processing time in the dither process varies from a processing time in the error diffusion process. Therefore, in case of attaching importance to the processing time, if the binarizing process is set as the high-speed process and the color correcting process is set as the automatic process, the process suitable for the use intended by the user can be performed.

(Other Embodiments)

The present invention can be applied to the system constructed by the plurality of equipments (e.g., host computer, interface equipment, reader, printer and the like) or can be also applied to the apparatus comprising the single equipment (e.g., copy machine, facsimile machine).

In the scope of the present invention, it is also included the invention which is employed by methods wherein program codes of a software to realize the functions of the above-described embodiments are supplied to a computer in an apparatus or a system connected to various devices so as to make the devices operative in order to realize the functions of the above-described embodiments, and the various devices are operated in accordance with the program stored in the computer (CPU or MPU) of the system or apparatus.

In such a case, the program codes themselves of the software realize the functions of the above-described embodiments, and the program codes themselves and means for supplying the program codes to the computer, e.g., a storage medium in which the program codes have been stored construct the present invention.

As such a memory medium to store the program codes, e.g., it is possible to use a floppy disk, a hard disk, an optical disk, a magneto-optical disk, a CD-ROM, a magnetic tape, a nonvolatile memory card, a ROM or the like can be used.

Also, it is obviously understood that, even in not only a case where the functions of the above-described embodiments are realized by executing the program codes supplied to the computer but also a case where the functions of the above-described embodiments are realized in cooperation with the OS (operating system) by which the program codes operate in the computer or another application software or the like, the program codes in these cases are also included in the embodiment of the present invention.

Further, it is obviously understood that the present invention also includes a case where the supplied program codes are stored into a memory provided for a function expansion board of a computer or a function expansion unit connected to a computer and, after that, a CPU or the like provided for the function expansion board or the function expansion unit executes a part or all of the actual processes on the basis of instructions of the program codes, and the functions of the above-described embodiments are realized by the processes.

What is claimed is:

1. An image processing apparatus comprising:

input means for inputting input image information which represents an object image and includes a logical operation table;

color conversion means for converting the input image information into color image data consisting of a black density component and a plurality of color density components;

quantization process means for quantizing said color image data consisting of a black density component and a plurality of color density components;

conversion means for converting the quantized color image data into linearly independent color image data, by converting the black density component into the plurality of color density components;

logical operation process means for performing, on the basis of the logical operation table, a logical operation on a plurality of color component data which constitute the linearly independent color image data converted by said conversion means; and generating means for generating color image data consisting of a black density component and a plurality of color density components from the plurality of color component data on which the logical operation process is performed.

2. An apparatus according to claim 1, further comprising:

judgment means for judging a kind of the object image on the basis of a drawing function included in the input image information; and color matching process means for performing a color matching process on the input image information, and wherein said color matching process means performs the color matching process according to the kind of the object image judged by said judgment means.

3. An apparatus according to claim 2, wherein the kind of the object image includes a character image, a graphics image and a natural image, and said logical operation process means performs the logical operation as a process for the graphics image.

4. An apparatus according to claim 1, wherein said logical operation process means performs a process to form a new image by combining a plurality of images with others on the basis of the logical operation table.

5. An image process method comprising:

an input step of inputting input image information which represents an object image and includes a logical operation table;

a color conversion step of converting the input image information into color image data consisting of a black density component and a plurality of color density components;

a quantization process step of quantizing the color image data consisting of a black density component and a plurality of color density components;

a conversion step of converting the color image data into linearly independent color image data, by converting the black density component into the plurality of color density components;

a logical operation process step of performing, on the basis of the logical operation table, a logical operation on a plurality of color component data which constitute the linearly independent color image data converted in said conversion step; and a generating step of generating color image data consisting of a black density component and a plurality of color density components from the plurality of color component data on which the logical operation process is performed.

6. An image process method comprising:

an input step of inputting input image information which represents an object image and includes a drawing function and a color designation code;

a developing step of developing binary data representing said object image in a memory in accordance with the image information;

a setting step of setting a color matching process according to a kind of the object image by analyzing the drawing function; and a color matching process step of performing the color matching process on the object image, on a basis of the setting in said setting step, wherein, in a case where the input image information includes information of a bit map format, and a judging step of judging whether a color matching process condition for a natural image is set on the object or a color matching process condition for a graphics image is set on the object, on a basis of information which represents a number of colors and has been added to a header of said bit-map information.

7. A recording medium which stores a program for executing an image process method comprising:

an input step of inputting input image information which represents an object image and includes a logical operation table;

a color conversion step of converting the input image information into color image data consisting of a black density component and a plurality of color density components;

a quantization process step of quantizing the color image data consisting of a black density component and a plurality of color density components;

a conversion step of converting the color image data into linearly independent color image data, by converting the black density component into the plurality of color density components;

a logical operation process step of performing, on the basis of the logical operation table, a logical operation on a plurality of color component data which constitute the linearly independent color image data converted in said conversion step; and a generating step of generating color image data consisting of a black density component and a plurality of color density components from the plurality of color component data on which the logical operation process is performed.

8. A recording medium which stores a program for executing an image process method comprising:

an input step of inputting input image information which represents an object image and includes a drawing function and a color designation code;

a developing step of developing binary data representing said object image in a memory in accordance with the image information;

a setting step of setting a color matching process according to a kind of the object image by analyzing the drawing function; and a color matching process step of performing the color matching process on the object image, on a basis of the setting in said setting step, wherein, in a case where the input image information includes information of a bit map format, a judging step of judging whether a color matching process condition for a natural image is set on the object or a color matching process condition for a graphics image is set on the object, on a number of colors and has been added to a header of said bit-map information.

9. An apparatus according to claim 1, wherein said quantization process means performs a same dither process on said black density component and said plurality of color density components.

* * * * *

UNITED STATES PATENT AND TRADEMARK OFFICE
CERTIFICATE OF CORRECTION

PATENT NO.     : 6,456,404 B1                                       Page 1 of 1
DATED          : September 24, 2002
INVENTOR(S)    : Tomoyuki Furuya et al.

It is certified that error appears in the above-identified patent and that said Letters Patent is hereby corrected as shown below:

<u>Drawings,</u>
Sheet 5, Figure 6, "PAXEL" should read -- PIXEL --.

<u>Column 1,</u>
Line 39, "printer)." should read -- a printer). --.

<u>Column 4,</u>
Line 48, "of a" should read -- of --.

<u>Column 5,</u>
Line 63, "binary" (first occurrence) should read -- multivalue --.

<u>Column 10,</u>
Line 14, "be also" should read -- also be --.

Signed and Sealed this

Eighth Day of April, 2003

JAMES E. ROGAN
*Director of the United States Patent and Trademark Office*